United States Patent
Fujiwara et al.

(10) Patent No.: US 12,217,513 B2
(45) Date of Patent: Feb. 4, 2025

(54) DEVICE, SYSTEM, AND METHOD FOR GENERATING OCCUPANCY GRID MAP

(71) Applicant: DENSO CORPORATION, Kariya (JP)

(72) Inventors: Naohiro Fujiwara, Kariya (JP); Makoto Ohkado, Kariya (JP); Ariya Terani, Kariya (JP); Itsuki Chiba, Kariya (JP)

(73) Assignee: DENSO CORPORATION, Kariya (JP)

( * ) Notice: Subject to any disclaimer, the term of this patent is extended or adjusted under 35 U.S.C. 154(b) by 364 days.

(21) Appl. No.: 17/656,623

(22) Filed: Mar. 25, 2022

(65) Prior Publication Data

US 2022/0215673 A1 Jul. 7, 2022

Related U.S. Application Data

(63) Continuation of application No. PCT/JP2020/028376, filed on Jul. 22, 2020.

(30) Foreign Application Priority Data

Sep. 27, 2019 (JP) ................................ 2019-177053

(51) Int. Cl.
```
G06V 20/58    (2022.01)
G06V 10/74    (2022.01)
G01S 13/86    (2006.01)
G01S 13/89    (2006.01)
```
(52) U.S. Cl.
CPC .............. *G06V 20/58* (2022.01); *G06V 10/74* (2022.01); *G01S 13/867* (2013.01); *G01S 13/89* (2013.01)

(58) Field of Classification Search
None
See application file for complete search history.

(56) References Cited

FOREIGN PATENT DOCUMENTS

| JP | 2014137743 A | * | 7/2014 | |
| JP | 2017166966 A | * | 9/2017 | ............. G01S 13/42 |
| JP | 2019-046147 A | | 3/2019 | |
| JP | 6552678 B1 | * | 7/2019 | |

OTHER PUBLICATIONS

Translation for JP 2014137743 (Year: 2014).*
Translation for JP 2017166966 (Year: 2017).*
Translation for JPP 6552678 (Year: 2019).*

* cited by examiner

*Primary Examiner* — Lennin R Rodriguezgonzalez
(74) *Attorney, Agent, or Firm* — Maschoff Brennan

(57) ABSTRACT

In an occupancy grid map generation device for generating an occupancy grid map that indicates, for each of cells of a grid into which a region is divided, an occupancy probability that an object occupies the cell, an occupancy probability updating unit is configured to, based detection result data of an object therearound, successively update the occupancy probability for each of the cells calculated at a previous time to calculate a latest occupancy probability. An updating weight calculation unit is configured to acquire data about presence or absence of an object in each of the cells therearound based on map data, and determine a weight of the detection result data used by the occupancy probability updating unit to update the occupancy probability for the cell, based on a degree of match between the data about presence or absence of an object in the cell and the detection result data.

9 Claims, 4 Drawing Sheets

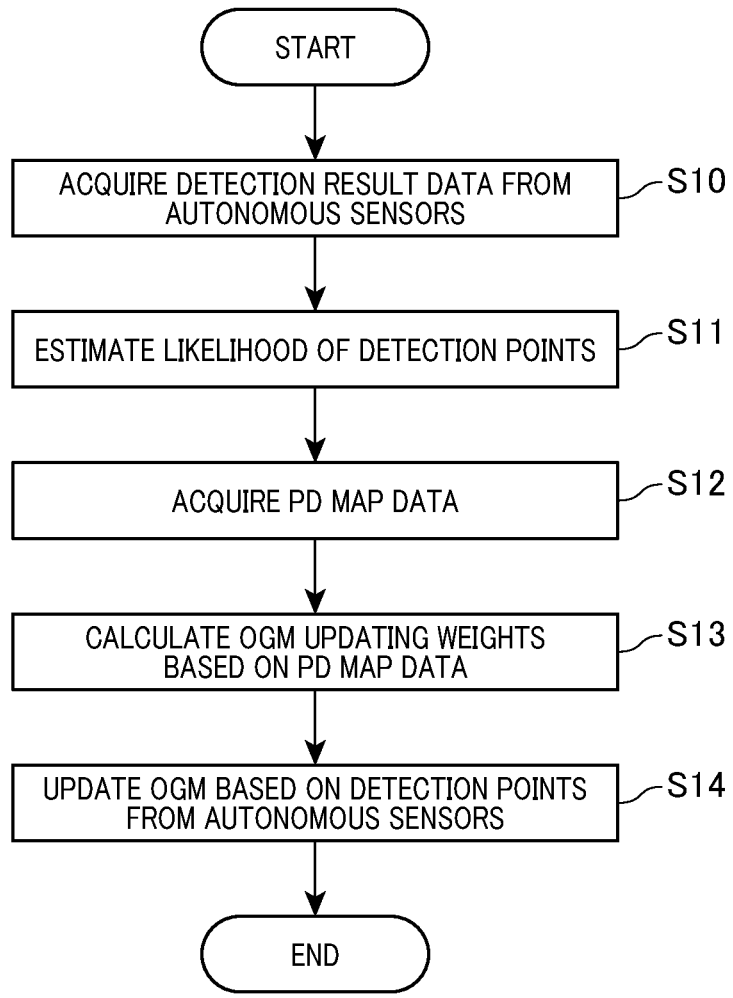

FIG.5A

|  |  | AUTONOMOUS SENSORS | |
|---|---|---|---|
|  |  | YES | NO |
| PD MAP WITH HIGH ACCURACY | YES | 5 | 1 |
|  | NO | 3 | 5 |

FIG.5B

|  |  | AUTONOMOUS SENSORS | |
|---|---|---|---|
|  |  | YES | NO |
| PD MAP WITH LOW ACCURACY | YES | 4 | 2 |
|  | NO | 3 | 4 |

DEVICE, SYSTEM, AND METHOD FOR GENERATING OCCUPANCY GRID MAP

CROSS-REFERENCE TO RELATED APPLICATION

This application is a continuation application of International Application No. PCT/JP2020/028376 filed Jul. 22, 2020 which designated the U.S. and claims priority to Japanese Patent Application No. 2019-177053 filed with the Japan Patent Office on Sep. 27, 2019, the contents of each of which are incorporated herein by reference.

BACKGROUND

Technical Field

This disclosure relates to a technique for generating an occupancy grid map.

Related Art

Occupancy Grid Map (OGM) is known as one of methods to recognize travelable regions (free space) where vehicles can travel. According to the OGM, a region is divided into a grid, and each cell of the grid has an occupancy probability assigned that an object (three-dimensional object) occupies the cell. The occupancy probability for each cell is updated in chronological order.

BRIEF DESCRIPTION OF THE DRAWINGS

In the accompanying drawings:

FIG. 3 is an illustration of updating weights;

FIG. 4 is a flowchart of operations of the OGM generation device;

FIG. 5A is an illustration of the accuracy of a PD map and updating weights for the PD map with high accuracy; and FIG. 5B is an illustration of the accuracy of a PD map and updating weights for the PD map with low accuracy.

DESCRIPTION OF SPECIFIC EMBODIMENTS

As to the above known occupancy grid map as disclosed in JP 2019-46147 A, it is difficult to set how much to update the occupancy probability for each cell in each frame (referred to as an updating width) when updating the above known occupancy grid map in time series. If the updating width is large, the probability changes significantly from frame to frame, resulting in a large occupancy probability even for clutter. On the other hand, if the updating width is too small, it will take time to identify a target.

In view of the above, it is desired to have an occupancy grid map generation device that can appropriately control an updating width for the occupancy probability.

One aspect of the present disclosure provides an occupancy grid map generation device for generating an occupancy grid map that indicates, for each of a plurality of cells of a grid into which a region is divided, an occupancy probability that an object occupies the cell. In the occupancy grid map generation device, a data acquisition unit is configured to acquire, from a detection device that detects an object therearound, detection result data of the object. An occupancy probability updating unit is configured to, based the detection result data, successively update the occupancy probability for each of the plurality of cells calculated at a previous time to calculate a latest occupancy probability. A map data acquisition unit is configured to acquire map data therearound. An updating weight calculation unit is configured to acquire data about presence or absence of an object in each of the plurality of cells therearound based on the map data, and determine a weight of the detection result data used by the occupancy probability updating unit to update the occupancy probability for the cell, based on a degree of match between the data about presence or absence of an object in the cell and the detection result data.

The present disclosure enables proper control of the updating width of the occupancy probability using the map data.

An occupancy grid map generation device (hereinafter referred to as an OGM generation device) 10 according to one embodiment of the present disclosure will now be described with reference to the accompanying drawings. In the present embodiment, the OGM generation device 10 is mounted to each of a plurality of vehicles, forming an occupancy grid map generation system (hereinafter referred to as an OGM generation system) 1. The present embodiment is not limited thereto. The OGM generation device 10 may be used as a stand-alone unit and does not necessarily have to be mounted to a vehicle.

Figure 1:
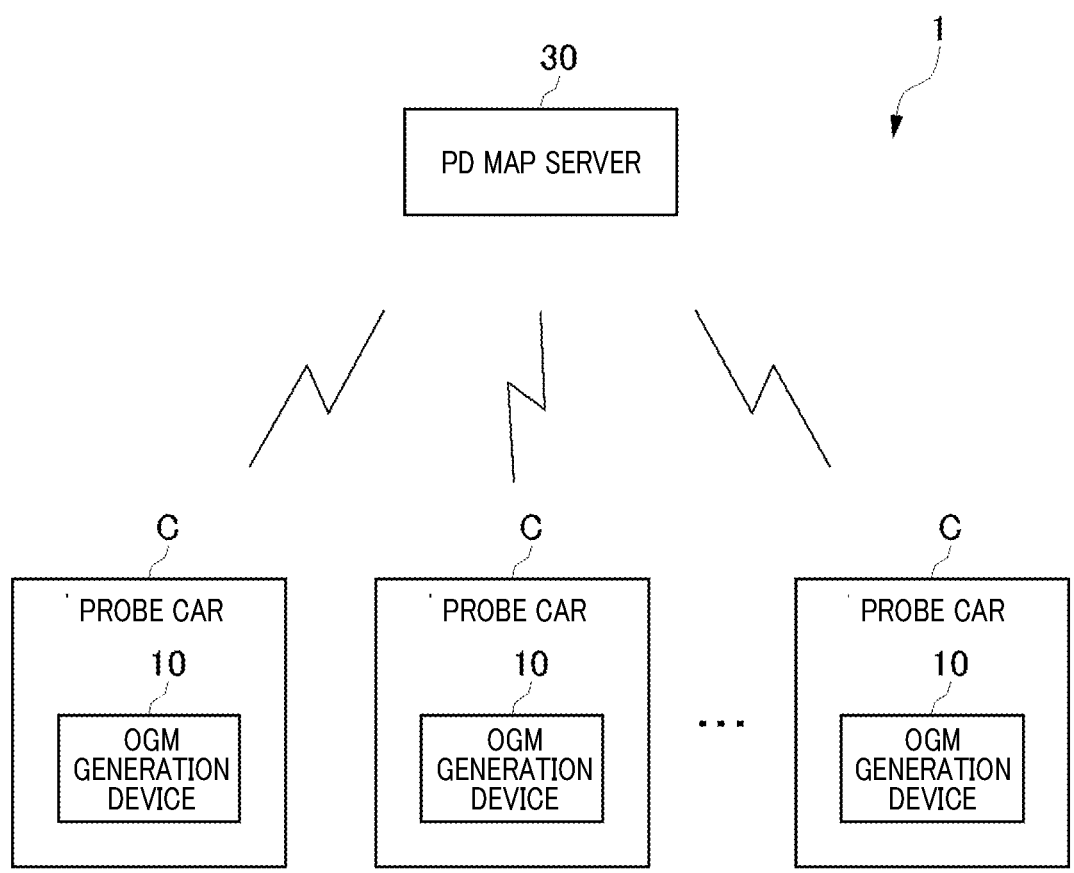
FIG. 1 is a schematic diagram of an OGM generation system.

FIG. 1 illustrates a configuration of the OGM generation system 1. The OGM generation system 1 includes the OGM generation devices 10 mounted to respective ones of a plurality of probe cars C and a probe data map server (hereinafter referred to as a PD map server) 30.

Each probe car C transmits detection data of objects around the probe car C and data of the current location of the probe car C to the PD map server 30. The PD map server 30 generates a probe data map (hereinafter referred to as a PD map) based on the detection data collected from the plurality of probe cars C. The PD map server 30 generates, in response to a request from each probe car C, distribute the PD map around the probe car C.

Figure 2:
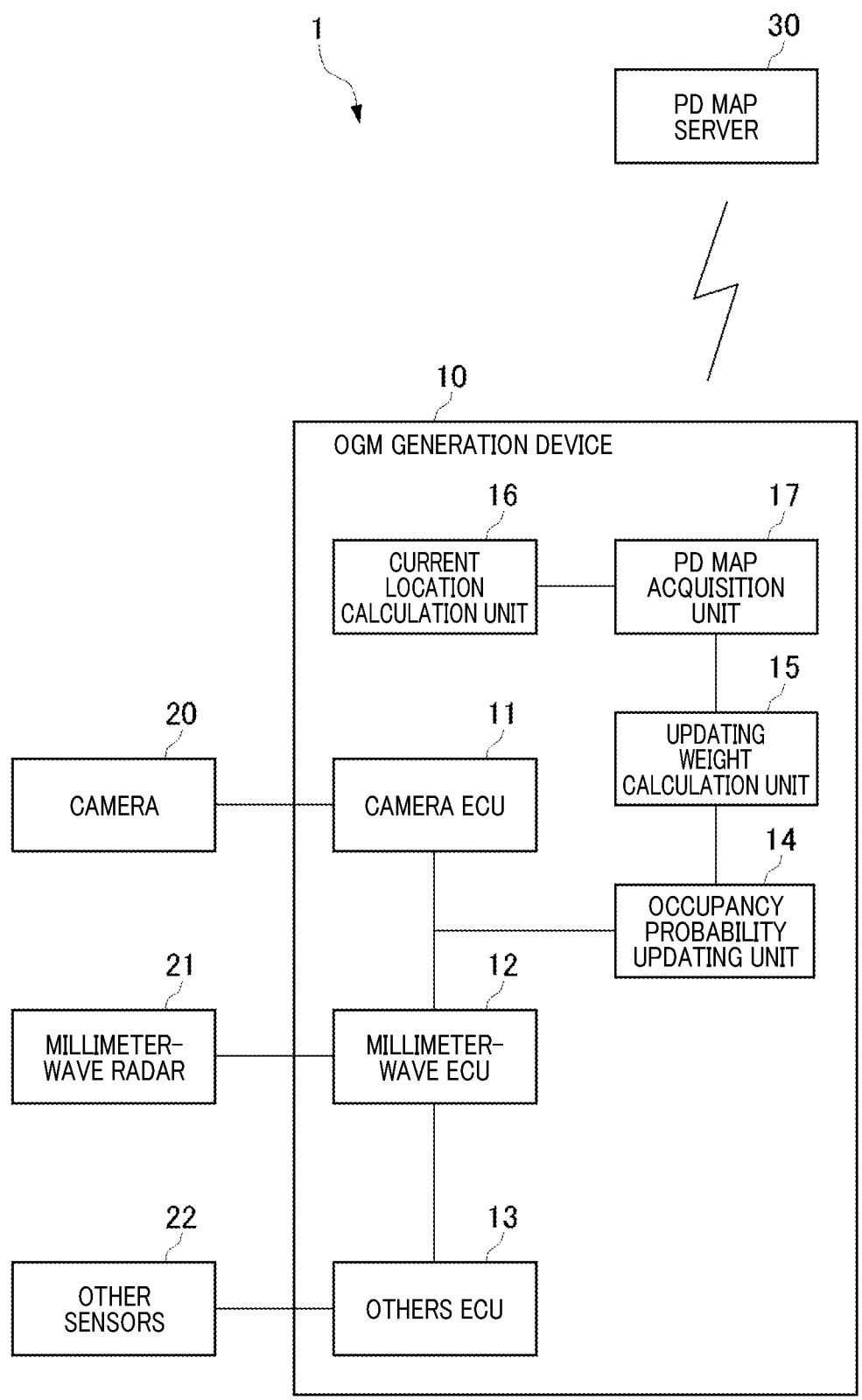
FIG. 2 is a schematic diagram of an OGM generation device.

FIG. 2 illustrates the configuration of each OGM generation device 10. The OGM generation device 10 is a generation device configured to generate an occupancy grid map that indicates, for each of a plurality of cells of a grid into which a region is divided, the occupancy probability that an object occupies the cell.

The OGM generation device 10 is connected to a camera 20, a millimeter-wave radar 21, and other sensors 22 mounted to the vehicle that is the probe car C. Images captured by the camera 20 are processed by a camera electronic control unit (ECU) 11 to detect objects in the surroundings. Data acquired by the millimeter-wave radar 21 is processed by a millimeter-wave ECU 12 to detect objects in the surroundings. Other sensors 22 are the other devices that detect objects in the surroundings, and data acquired by the other sensors 22 is processed by an others ECU 13. The camera 20, the millimeter-wave radar 21, and the other sensors 22 correspond to devices configured to detect objects in the surroundings. Detection result data of objects acquired by the camera ECU 11, the millimeter-wave ECU 12, and the others ECU 13 is input to an occupancy probability updating unit 14. In the following description, vehicle-mounted sensors, such as the cameras 20, the millimeter-wave radar 21, and the other sensors 22, are referred to as autonomous sensors. Although the camera 20 and the millimeter-wave radar 21 are listed as an example, the types of sensors are not limited to these sensors. Various types of sensors are may be used as the other sensors 22. One or more of the camera ECU 11, the millimeter-wave ECU 12, and the others ECU 13 correspond to a data acquisition unit.

The occupancy probability updating unit 14 has a function of updating the occupancy probability for each cell in the OGM based on the detection result data of objects in the surroundings. The occupancy probability is a probability that a three-dimensional object is present in the cell.

The occupancy probability updating unit 14 updates the OGM at predefined timings, where the occupancy probability updating unit 14 successively updates the OGM generated at the previous timing, if any, by updating the occupancy probability for each cell in that OGM. That is, the occupancy probability updating unit 14 does not replace the occupancy probability for each cell based on the detection result data from the camera 20 and the millimeter-wave radar 21, but updates the occupancy probability for each cell in the previously generated OGM based on the detection result data. In a condition where no OGM has been generated, such as at startup, the occupancy probability updating unit 14 calculates the occupancy probability for each cell in the OGM based on the detection result data. This is because there is not any OGM generated at the previous timing.

An updating weight calculation unit 15 has a function of calculating a weight of the detection result data used to update the occupancy probabilities. When weighting the likelihood of the detection points acquired based on the detection result data, the weight of the detection result data is increased. When weighting the occupancy probabilities for the OGM at the previous time, the weight of the detection result data is decreased. Therefore, the weight calculated by the updating weight calculation unit 15 allows an updating width when the occupancy probability updating unit 14 updates the occupancy probabilities to be controlled. The updating weight calculation unit 15 uses the PD map data to calculate the updating weight.

A current location calculation unit 16 has a function of detecting the current location of the own vehicle. The current location calculation unit 16 is, for example, a GPS receiver. A PD map acquisition unit 17 transmits data of the current location calculated by the current location calculation unit 16 to the PD map server 30, and requests download of the PD map data around the current location. Upon receipt of the PD map data from the PD map server 30, the PD map acquisition unit 17 forwards the received PD map to the updating weight calculation unit 15. The PD map acquisition unit 17 corresponds to a map data acquisition unit. The current location calculation unit 16 corresponds to a current location detection unit.

The PD map data is generated using the detection result data collected from the plurality of probe cars C and includes data about objects around the probe car C. However, the accuracy of the PD map data depends on an amount and newness of probe data collected and is not necessarily constant.

The updating weight calculation unit 15 acquires data about the presence or absence of an object in each cell based on the PD map acquired from the PD map server 30. Since the PD map is formed of data of latitude and longitude and object attribute, the updating weight calculation unit 15 converts the acquired PD map into a grid map as viewed from the own vehicle using data of the location of the own vehicle. This provides data about the presence or absence of an object in each of cells of a grid into which a region proximate to the own vehicle is divided (i.e., each cell proximate to the own vehicle). The updating weight calculation unit 15 then calculates a weight of the detection result data when updating the occupancy probability for each cell based on a degree of match between the data about the presence or absence of an object in each cell and the detection result data from the autonomous sensor. For the PD map having information in the form of a grid map, the data about the presence or absence of an object in each cell indicated by the PD map can be used to calculate the updating weight for each cell.

FIG. 3 illustrates the updating weights. In FIG. 3, "YES" and "NO" for the "PD MAP" respectively indicate the presence and absence of an object in the PD map data, and "YES" and "NO" for "AUTONOMOUS SENSORS" respectively indicate the presence and absence of an object based on the detection result data from the autonomous sensors.

As illustrated in FIG. 3, in a case where the presence or absence of an object is consistent between the PD map and the detection result from the autonomous sensors, the updating weight is set to "LARGE". Conversely, in a case where the presence or absence of an object is not consistent between the PD map and the detection result from the autonomous sensors, the updating weight is set to "MEDIUM" or "SMALL". That is, the updating weight is set larger when the presence or absence of an object is consistent than when it is not. Values of the updating weights "LARGE," "MEDIUM," and "SMALL" may be set experimentally as appropriate.

In a case where the presence or absence of an object is not consistent between the PD map and the detection result from the autonomous sensors, the updating weight is changed depending on whether the autonomous sensors determine that an object is present or absent. That is, in a case where the PD map indicates "NO" and the detection result from the autonomous sensors indicates "YES", an object (e.g., a vehicle) may have appeared in a cell (e.g., a road) where nothing exists, and the detection result data from the autonomous sensors may not be wrong. Therefore, the updating weight based on the detection result data is set to "MEDIUM". Conversely, in a case where the PD map indicates "YES" and the detection result from the autonomous sensors indicates "NO", the detection result data from the autonomous sensors may be wrong.

Therefore, the updating weight is set to "SMALL". When the state where the PD map indicates "NO" and the detection result from the autonomous sensors indicates "YES" continues for a certain number of consecutive frames, an object is likely present. Therefore, the updating weight may be set to "LARGE".

The updating weight calculation unit 15 forwards the updating weight data to the occupancy probability updating unit 14. When updating the occupancy probability for each cell based on the detection result data, the occupancy probability updating unit 14 uses the updating weights received from the updating weight calculation unit 15.

FIG. 4 illustrates the operations of the OGM generation device 10. The OGM generation device 10 acquires detection result data from the autonomous sensors (at S10). The OGM generation device 10 then acquires detection points of objects based on the detection result data and estimates a likelihood of the detection points of each object (at S11).

The OGM generation device 10 acquires PD map data around the current location from the PD map server 30 (at S12), and based on the PD map data and the detection result data, calculates weights of the detection result data used when updating the occupancy probability for each cell in the OGM (at S13). Based on the detection points from the autonomous sensors, the OGM generation device 10 updates the OGM using the weights calculated by the updating weight calculation unit 15 (at S14).

The configuration of the OGM generation device 10 in the present embodiment has been described above. An example of hardware of the OGM generation device 10 is a computer including a CPU, a RAM, a ROM, a hard disk, a display, a communication interface, and the like. A program including modules to implement the above functions of the blocks 11-17 illustrated in FIG. 10 is stored in the RAM or ROM. The above OGM generation device is implemented by the CPU executing the program. Such a program is also included in the scope of the present disclosure.

The configurations and operations of the OGM generation system 1 and the OGM generation device 1 have been described.

The OGM generation device 10 according to the above-described embodiment uses information about the presence or absence of an object based on the PD map data to calculate the updating weights that reflect the detection result from the autonomous sensors, which allows the OGM to be updated with appropriate updating weights. When the detection result data from the autonomous sensors matches the PD map data, the updating weights are increased. This enables earlier identification of a target, which can reduce undetected objects. Conversely, when the detection result data from the autonomous sensors does not match the PD map data, the updating weights are decreased. This can reduce false detections.

The OGM generation device of the present embodiment has been described above, but the OGM generation device of this disclosure is not limited to the specific embodiment described above. The OGM generation device of this disclosure may calculate the updating weights for the OGM based on the accuracy of the PD map. The accuracy of the PD map may be determined from the amount of probe data used to generate the PD map. The accuracy of the PD map generated from a large amount of probe data is high, while the accuracy of the PD map generated from a small amount of probe data can not be high. In the present disclosure, the accuracy of the PD map with the amount of probe data used to generate the PD map equal to or greater than a predefined threshold may be high. The accuracy of the PD map with the amount of probe data used to generate the PD map less than the threshold may be low.

FIG. 5A illustrates the updating weights for the PD map with high accuracy, and FIG. 5B illustrates the updating weights for the PD map with low accuracy. In FIGS. 5A and 5B, the updating weights are indicated on a 5-point numerical rating scale. As illustrated in FIGS. 5A and 5B, as the accuracy of the PD map increases, the updating weights for a high degree of match between the PD map and the autonomous sensors may be increased. Although FIGS. 5A and 5B illustrates the updating weights for the accurate and inaccurate PD maps, the updating weights may be changed according to the date and time the PD map was updated. That is, the more recent the date and time of the latest update, the greater the updating weights for a high degree of match between the autonomous sensors and the PD map.

In the above-described embodiment, the data about the presence or absence of an object based on the PD map is a binary value of "YES" or "NO," but information about the presence or absence of an object may be a probability value. The updating weights may be calculated based on the degree of match between this probability value and the likelihood of the detection points acquired at step S11.

In the above-described embodiment, the PD map is used as map data, but the map data does not have to be the PD map.

Electronic maps compiled and produced by any company may be used as the map data.

In the above-described embodiment, the updating weights are calculated using map data, but they may also be calculated based on data acquired via a vehicle-to-vehicle communication, a roadside-to-vehicle communication or the like.

This disclosure is useful to provide a device for generating an occupancy probability map in a region proximate to the own vehicle.

What is claimed is:

1. An occupancy grid map generation device for generating an occupancy grid map that indicates, for each of a plurality of cells of a grid into which a region is divided, an occupancy probability that an object occupies the cell, the occupancy grid map generation device comprising:
a data acquisition unit configured to acquire, from a detection device that detects an object therearound, detection result data of the object;
an occupancy probability updating unit configured to, based the detection result data, successively update the occupancy probability for each of the plurality of cells calculated at a previous time to calculate a latest occupancy probability;
a map data acquisition unit configured to acquire map data therearound; and
an updating weight calculation unit configured to acquire data about presence or absence of an object in each of the plurality of cells therearound based on the map data, and determine a weight of the detection result data used by the occupancy probability updating unit to update the occupancy probability for the cell, based on a degree of match between the data about presence or absence of an object in the cell and the detection result data.

2. The occupancy grid map generation device according to claim 1, wherein
the updating weight calculation unit is configured to, when the degree of match between the detection result data and the data about presence or absence of an object based on the map data is high, calculate the weight of the detection result data to be greater than when the degree of match is low.

3. The occupancy grid map generation device according to claim 2, wherein
the map data acquired by the map data acquisition unit is a probe data map generated from data collected from probe cars, and
the updating weight calculation unit is configured to calculate the weight for a high degree of match between the detection result data and the data about presence or absence of an object based on the probe data map such that the weight increases as an accuracy of the probe data map increases.

4. The occupancy grid map generation device according to claim 2, wherein
the map data acquired by the map data acquisition unit is a probe data map generated from data collected from probe cars, and
the updating weight calculation unit is configured to calculate the weight for a high degree of match between the detection result data and the data about presence or absence of an object based on the probe data map such that the weight increases as an updating date and time of the probe data map is more recent.

5. An occupancy grid map generation system comprising:
a plurality of vehicles equipped with a detection device configured to detect an object therearound, a current location detection unit configured to detect data of a current location, and an occupancy grid map generation device for generating an occupancy grid map that indicates, for each of a plurality of cells of a grid into which a region around the current location is divided, an occupancy probability that an object occupies the cell;
a probe data map server configured to acquire, from each of the plurality of vehicles, detection result data from the detection device and the data of the current location, wherein
the occupancy grid map generation device of each of the plurality of vehicles comprises:
a data acquisition unit configured to acquire, from the detection device, detection result data of the object;
an occupancy probability updating unit configured to, based the detection result data, successively update the occupancy probability for each of the plurality of cells calculated at a previous time to calculate a latest occupancy probability;
a map data acquisition unit configured to acquire probe data map around the current location of the vehicle from the probe data map server; and
an updating weight calculation unit configured to acquire data about presence or absence of an object in each of the plurality of cells around the current location based on the probe data map, and determine a weight of the detection result data used by the occupancy probability updating unit to update the occupancy probability for the cell, based on a degree of match between the data about presence or absence of an object in the cell and the detection result data from the detection device, the updating weight calculation unit being configured to, when the degree of match between the detection result data and the data about presence or absence of an object based on the probe data map is high, calculate the weight of the detection result data to be greater than when the degree of match is low.

6. The occupancy grid map generation device according to claim 5, wherein
the updating weight calculation unit is configured to calculate the weight for a high degree of match between the detection result data and the data about presence or absence of an object based on the probe data map such that the weight increases as an accuracy of the probe data map increases.

7. The occupancy grid map generation device according to claim 5, wherein
the updating weight calculation unit is configured to calculate the weight for a high degree of match between the detection result data and the data about presence or absence of an object based on the probe data map such that the weight increases as an updating date and time of the probe data map is more recent.

8. An occupancy grid map generation method for generating an occupancy grid map that indicates, for each of a plurality of cells of a grid into which a region is divided, an occupancy probability that an object occupies the cell, the occupancy grid map generation method comprising:
acquiring, from a detection device that detects an object therearound, detection result data of the object;
based the detection result data, successively updating the occupancy probability for each of the plurality of cells calculated at a previous time to calculate a latest occupancy probability;
acquiring map data therearound;
acquiring data about presence or absence of an object in each of the plurality of cells therearound based on the map data, and calculating a weight of the detection result data to update the occupancy probability for the cell, based on a degree of match between the data about presence or absence of an object in the cell and the detection result data; and
based on the detection result data and the calculated weight, successively updating the occupancy probability for each of the plurality of cells calculated at the previous time to calculate a latest occupancy probability.

9. A non-transitory computer-readable storage media having instructions stored thereon that, when executed by a computer, cause the computer to perform an occupancy grid map generation method for generating an occupancy grid map that indicates, for each of a plurality of cells of a grid into which a region is divided, an occupancy probability that an object occupies the cell, the occupancy grid map generation method comprising:
acquiring, from a detection device that detects an object therearound, detection result data of the object;
based the detection result data, successively updating the occupancy probability for each of the plurality of cells calculated at a previous time to calculate a latest occupancy probability;
acquiring map data therearound;
acquiring data about presence or absence of an object in each of the plurality of cells therearound based on the map data, and calculating a weight of the detection result data to update the occupancy probability for the cell, based on a degree of match between the data about presence or absence of an object in the cell and the detection result data; and
based on the detection result data and the calculated weight, successively updating the occupancy probability for each of the plurality of cells calculated at the previous time to calculate a latest occupancy probability.

* * * * *